United States Patent [19]

Kondo et al.

[11] Patent Number: 4,466,625
[45] Date of Patent: Aug. 21, 1984

[54] ROAD VEHICLE LEVEL CONTROLLER

[75] Inventors: Kouichi Kondo; Masahiro Ueda, both of Toyota; Seiji Nonoyama, Kariya, all of Japan

[73] Assignees: Aisin Seiki Kabushikaisha, Toyota; Toyota Jidosha Kogyo Kabushiki Kaisha, Tokyo, both of Japan

[21] Appl. No.: 346,325

[22] Filed: Feb. 5, 1982

[30] Foreign Application Priority Data

Feb. 9, 1981 [JP] Japan .................................. 56-17858

[51] Int. Cl.$^3$ ............................................ B60G 17/00
[52] U.S. Cl. .................................. 280/6 R; 267/64.16; 280/707
[58] Field of Search .................... 280/6 R, 6.1, 6.11, 280/707; 267/65 D, 64.16

[56] References Cited

U.S. PATENT DOCUMENTS 3,218,088 11/1965 Nallinger et al. .................. 280/6 R
4,105,216 8/1978 Graham et al. ..................... 280/6 R Primary Examiner—Richard A. Bertsch
Attorney, Agent, or Firm—Sughrue, Mion, Zinn, Macpeak and Seas

[57] ABSTRACT

A vehicle level controller produces a level lowering command signal whenever the sprung mass of a road vehicle is higher than a given trim band and produces a level raising command signal when the sprung mass is below the trim band. The command signal is applied to a levelling system. The trim band is divided into a high (medium high) and low (medium low) regions. A vehicle level detector produces a signal which distinguishes a vehicle level in four different zones including a range higher than the trim band, a medium high region within the trim band, a medium low region within the trim band and a range lower than the trim band. The level lowering and the level raising command signal are withdrawn whenever a signal from the level detector indicates the medium low and high region within the trim band, respectively.

11 Claims, 10 Drawing Figures

FIG.1e
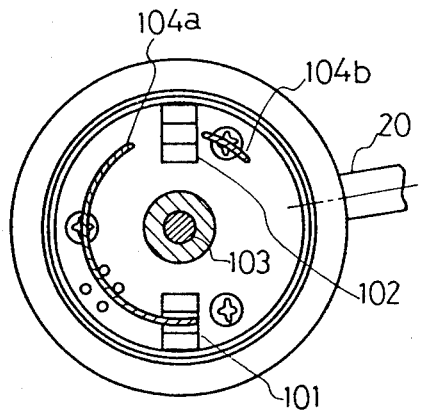
FIG.1f
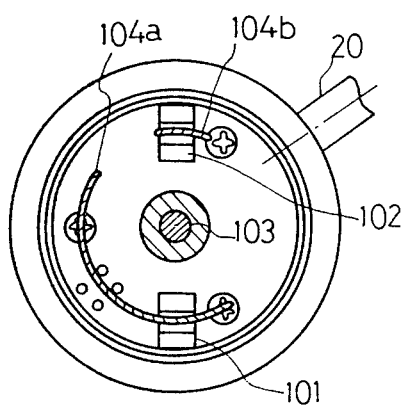
FIG.2b
| level | a | b | A | B | C | D | E | F |
|---|---|---|---|---|---|---|---|---|
| high | L | H | H | L | L | H | L | H |
| medium high | L | L | H | H | L | H | H | H |
| medium low | H | L | L | H | H | H | H | L |
| low | H | H | L | L | H | L | H | L |

ROAD VEHICLE LEVEL CONTROLLER

BACKGROUND OF THE INVENTION

The invention relates to a level control of a road vehicle, in particular, to the adjustment of a vehicle level within a given range by detecting the relative height between the axle and the frame of a carrosserie by means of a level detector and controlling a hydraulic pressure supplied to a suspension system in accordance with the detected height.

An example of the level adjustment of the kind described is disclosed in U.S. Pat. No. 4,105,216 (issued Aug. 8, 1978, Class 280), for example, in which a level detector detects a range of vehicle level, and the detected signal is processed in a signal processing circuit to derive a signal which energizes a levelling drive system. The signal is applied to a level control circuit which causes a hydraulic pressure supplied to a suspension system to be reduced if the vehicle level is determined to be "high" and causes the hydraulic pressure to be increased if the vehicle level is determined to be "low". In order to prevent a repetitive operation to reduce or increase the hydraulic pressure which would occur as the detected vehicle level oscillates adjacent to the boundary between "medium" and "high" or between "medium" and "low" region, the level control circuit includes a set of leading end delay circuits in each of "high" and "low" level signal processing loops.

The levelling drive system is energized to lower or raise the vehicle height at a given time interval after the detection of the vehicle height in either high or low region, respectively. If the vehicle level is determined to be in the medium region, the levelling drive system is immediately deenergized. Therefore, there is a tendency for the vehicle level to be settled in the medium region adjacent to the boundary with the high or the low region, resulting in a large deviation which is obtained in the settled level of the vehicle. In addition, the frequency of the energization or deenergization of the levelling drive system increases.

SUMMARY OF THE INVENTION

It is a first object of the invention to lessen the repetition of the energization or deenergization of the vehicle level adjustment, and a second object is to reduce a deviation between the levels where the vehicle height is settled.

The above objects are accomplished in accordance with the invention by providing a vehicle level detector which is capable of producing a signal which distinguishes between vehicle levels in at least "high", "medium high", "medium low" and "low" regions. In response to the level detection signal, which indicates a vehicle level in the "high" region, a level lowering command signal is produced and is maintained until a vehicle in the "medium low" region is reached. The lowering command signal causes a drive system associated with a suspension system to be energized to lower the vehicle level. On the contrary, if the signal indicates a vehicle level in the "low" region, a level raising command signal is produced and is maintained until a vehicle level in the "medium high" region is reached. The raising command signal energizes the drive system to lower the vehicle level. In this manner, the energization to lower or raise the vehicle level is initiated in response to the detection of a vehicle level in either the "high" or the "low" region, and the deenergization occurs at a target which is defined by the boundary between the "medium low" and the "medium high" region of the vehicle level. In this manner, a level lowering and raising operation involves a hysteresis. Accordingly, the operation can be summarized as aiming at a single point, which is the boundary between the "medium low" and the "medium high" region, minimizing a deviation in the vehicle level achieved. Nevertheless, the frequency of energization and deenergization is reduced.

BRIEF DESCRIPTION OF THE DRAWINGS

FIGS. 1c, 1d, 1e and 1f are cross sections taken along the line I—I shown in FIG. 1b, illustrating different operative conditions;

FIG. 2b is a chart illustrating various conditions of signals appearing in various parts of the embodiment;

FIG. 3b is a flow chart illustrating a sequence of operations of the embodiment shown in FIG. 3a.

DESCRIPTION OF EMBODIMENTS

Figure 1A:
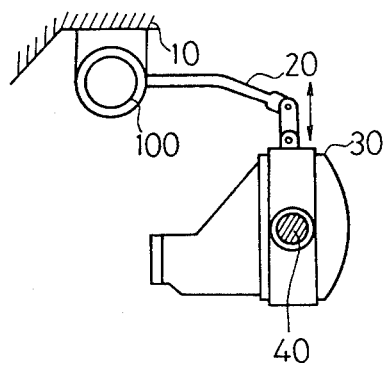
FIG. 1a is a schematic side elevation of a vehicle level detector used in an embodiment of the invention.
Figure 1B:
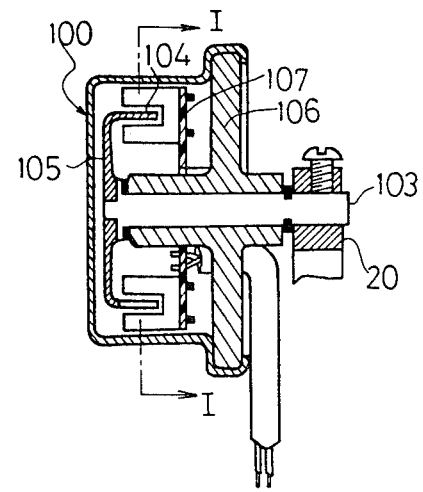
FIG. 1b is a cross section of the detector.
Figure 1C:
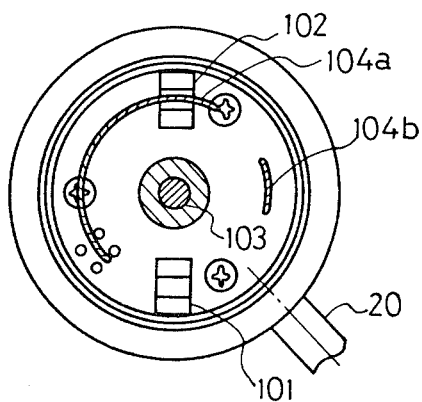
Figure 1D:
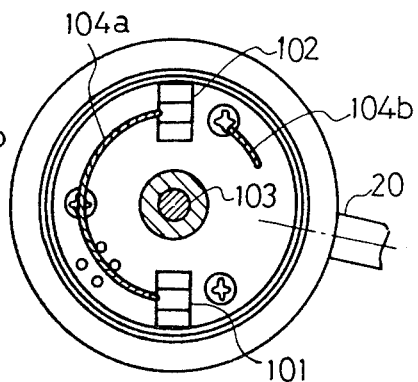
Figure 2A:
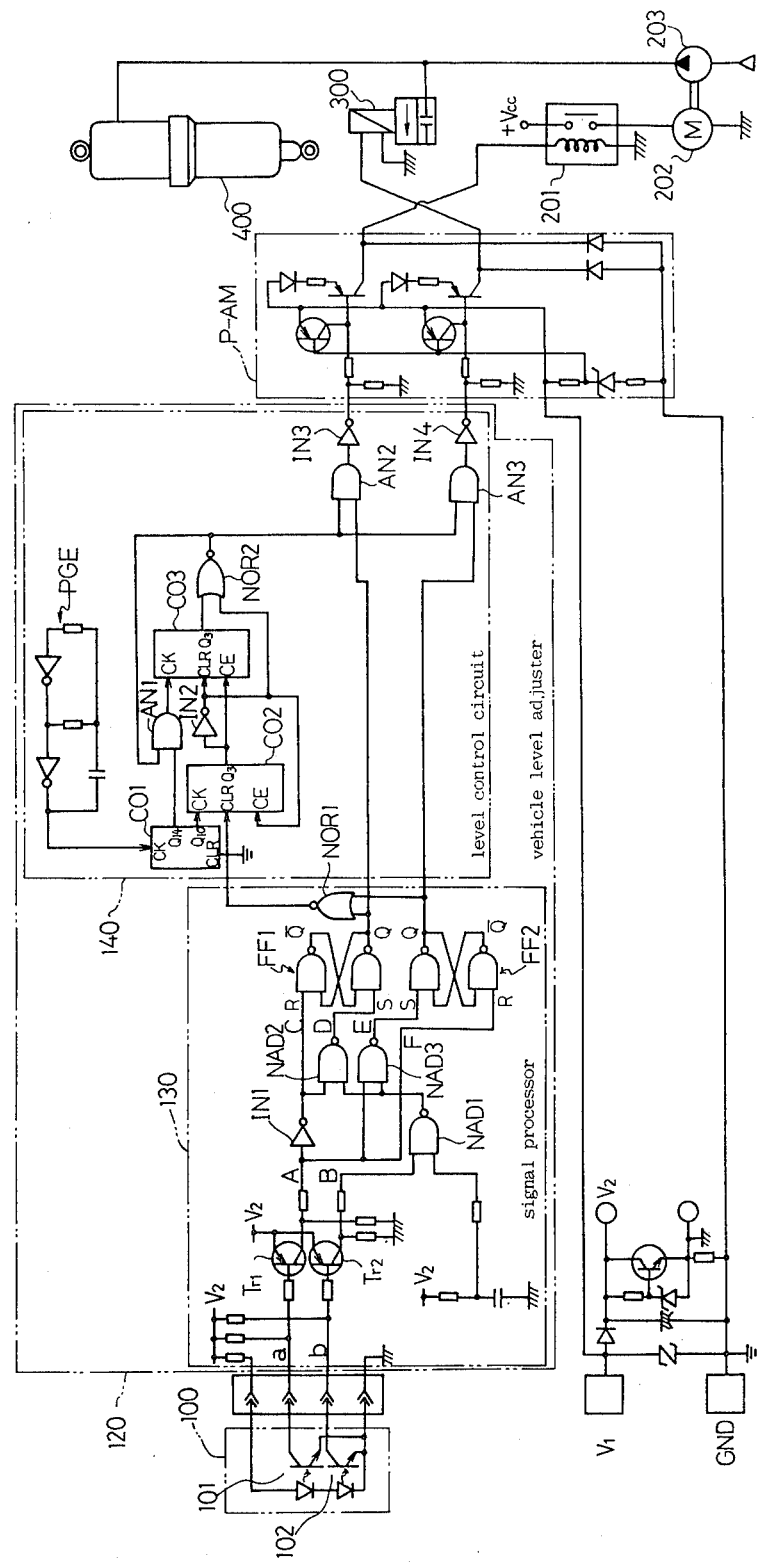
FIG. 2a is a block diagram of an embodiment of the invention.

Referring to FIG. 1a, there is shown a vehicle level detector 100 used in an embodiment of the invention, illustrating the manner of mounting the detector on a road vehicle. Specifically, the detector 100 is fixedly connected to the frame 10 of a carrosserie and includes a rotary shaft to which one end of a link 20 is coupled. The other end of the link 20 is coupled to an outer casing of a differential gear 30. An axle is shown at 40. The level detector 100 is shown in section in FIG. 1b. The level detector 100 includes a rotary shaft 103, on the free end of which is fixedly mounted a light shield 105 formed with a pair of turnbacks 104a, 104b which are in the form of arcuate segments. The link 20 is fixedly connected to the other end of the shaft 103. The detector includes a base 106 on which is fixedly mounted a printed wiring board 107 which in turn fixedly carries a pair of photosensors 101, 102. FIGS. 1c to 1f show cross sections taken along the line I—I shown in FIG. 1b. FIG. 1c corresponds to a "low" region vehicle level, FIG. 1d to a "medium high" region, FIG. 1e to a "medium low" region and FIG. 1f to a "low" region, respectively. Each of the photosensors 101 and 102 comprises a combination of a light emitting diode and a phototransistor as shown in FIG. 2, which are arranged such that light emitted by the light emitting diode and directed toward the phototransistor is adapted to be intercepted by selected turnbacks 104a, 104b of the light shield 105. The outputs a, b (see FIG. 2a) from the photosensors 101, 102 which depend on the vehicle level is illustrated in a chart shown in FIG. 2b.

Referring to FIG. 2a, which shows an embodiment of the invention, the photosensors 101, 102 of the level detector 100 are connected to a vehicle level adjuster 120 through connectors. The adjuster 120 comprises a signal processor 130 and a level control circuit 140.

The signal processor 130 includes a pair of inverting and amplifying transistors Tr1, Tr2, an inverter IN1, NAND gages NAD1 to NAD3, first and second flip-flops FF1, FF2 and NOR gate NOR1. The levels of signals A to F appearing at various points in the circuit arrangement of FIG. 2a which are designated by corresponding letters are indicated in the chart of FIG. 2b in relation to the levels of the inputs a and b. Referring to FIG. 2b for subsequent description, it is initially assumed that the vehicle level has now changed from the "medium high" to the "high" region. Considering the first flipflop FF1, it will be seen that there is no change in the set (S) input D and reset (R) input C, so that this flipflop remains reset. In the second flipflop FF2, the set (S) input E=L and the reset (R) input F=H, so that this flipflop is set to provide a Q output of H level (a level lowering command signal), which causes the output of NOR gate NOR1 to change from its H to its L level, instructing an adjustment of the vehicle level. If the vehicle level subsequently enters the "medium high" region, the set input E=H and the reset input F=H in the second flipflop FF2, which therefore maintains its status unchanged, thus continuing to output the level lowering command signal. However, when the vehicle level enters the "medium low" region, the set input E=H and the reset input F=L in the second flipflop FF2, which therefore reset to change its Q output from the H level (the level lowering command signal) to the L level (interruption of lowering the vehicle level). Thus, the output from NOR gate NOR1 changes from its L to its H level (interruption of adjusting the vehicle level). The flipflop FF1 continues to maintain its reset status. When the vehicle level enters the "low" region, the flipflop FF2 remains reset while the flipflop FF1 is set since the set input D=L and the reset input C=H. Accordingly, its Q output changes to the H level (a level raising command signal), whereby the output from gate NOR1 changes from its H to its L level, instructing an adjustment of the vehicle level. If the vehicle level returns to the "medium low" region subsequently, both the first and the second flipflop FF1, FF2 maintain their previous status (FF1 set and FF2 reset). If the vehicle level then changes to the "medium high" region, the first flipflop FF1 becomes reset since the set input D=H and the reset input C=L. Accordingly, its Q output changes from its H level (level raising command signal) to its L level (interruption of raising the vehicle level), and the output from gate NOR1 changes from its L level (instructing an adjustment of the vehicle level) to its H level (interruption of adjusting the vehicle level).

The level control circuit 140 includes a pulse generator PGE, a counter CO1 acting as a frequency divider, a counter CO2 for introducing a time delay in the energization which is used for adjusting the vehicle level, a third counter CO3 which determines a time limit of energization, AND gates AN1 to AN3, inverters IN2 to IN4 and NOR gate NOR2. The counters CO2 and CO3 assume a cleared condition as long as their CLR inputs remain at the H level, and count up during the time their CLR inputs remain at the L level and CE inputs remain at the H level. When the output from gate NOR1 assumes its L level (instructing an adjustment of the vehicle level), the counter CO2 begins up-counting until a given number of timing pulses, which are $Q_{10}$ bit outputs from the counter CO1, have been counted, whereupon its $Q_3$ bit output assumes an H level. When $Q_3$=H, this is inverted by the inverter IN2 before the L level is applied to the terminal CE to interrupt the up-counting operation by the counter CO2. Conversely, in response to the application of $Q_3$=H to its CE input terminal, the counter CO3 initiates an up-counting operation and continues it until a given number of timing pulses, which are $Q_{14}$ bit outputs from the counter CO1, have been counted, whereupon its $Q_3$ bit output assumes an H level. The gate NOR2 receives the output from the inverter IN2 and the $Q_3$ bit output from the counter CO3, and therefore produces an H output from the time the $Q_3$ bit output from the counter CO2 assumes an H level until the $Q_3$ bit output from the counter CO3 assumes an H level. When the $Q_3$ bit output from the counter CO3 assumes an H level, the output of the gate NOR2 changes to its L level, thereby disabling AND gate AN1 to cease the up-counting operation by the counter CO3. The output from the gate NOR2 is also applied to AND gates AN2 and AN3. The other input of the gate AN2 receives the level raising command signal produced by the signal processor 130 (or the high level Q output of the flipflop FF1) while the other input of the gate AN3 receives the level lowering command signal or the high level Q output from the flipflop FF2. The outputs of the gates AN2 and AN3 are fed through inverters IN3 and IN4, respectively, to an amplifier P-AM of a drive system associated with a suspension system, which comprises the amplifier P-AM, a relief valve 300, a relay 201, a motor 202 and an air compressor 203.

When the vehicle level enters the "high" region, the flipflop FF2 is set in the manner mentioned previously, applying the level lowering command signal H to the gates AN3 and NOR1, allowing the counter CO2 to initiate the up-counting operation. When the count in this counter reaches a given value corresponding to $Q_3$, the output of the gate NOR2 changes to an H level which enables an energization. Thereupon the output of the gate AN3 assumes an H level allowing the relief valve 300 to open at a preselected rate to withdraw the air from an air chamber of the suspension system 400. If the vehicle level returns to the "medium low" region before the counter CO2 counts up to the given count corresponding to $Q_3$ (or a time delay $t_s$ of the leading end), the flipflop FF2 is reset to cause the output of the gate NOR1 to resume the H level, whereby the counter CO2 is cleared, thus preventing the output from the gate NOR2 from assuming an H level. Accordingly, if the vehicle level temporarily changes to the "high" region and immediately returns to the "medium low" region as may be caused by oscillations, the relief valve 300 cannot be opened. At a time interval after the output of the gate NOR2 has changed to its H level (which allows the relief valve 300 to open), corresponding to the $Q_3$ count of the counter CO3, the output of NOR2 changes to the L level to cause the relief valve 300 to be closed if the level lowering command signal continues to be present. Thus, this time interval determines the maximum length of time during which the relief valve 300 is allowed to be opened. The purpose of such an arrangement is to prevent an excessive withdrawal of the air in the event the withdrawal of the air fails to achieve a reduction in the vehicle level due to failure of certain parts or under a very light loading of the vehicle. However, in normal instances, the vehicle level begins to be lowered as the relief valve 300 is opened, and the vehicle level will reach the "medium low" region by the time the counter CO3 completes its up-counting operation to the given number. In this manner, the flipflop FF2 is reset to change the output of the gate AN3 to its L level, thus causing the relief valve 300 to be closed.

When the vehicle level enters the "low" region, the flipflop FF1 is set in the manner mentioned previously, applying the level raising command signal H to both the gate AN2 and the gate NOR1, allowing the counter CO2 to initiate its up-counting operation. When this counter has counted up to a given count corresponding to the $Q_3$ count, the output of the gate NOR2 assumes the H level which enables an energization. Accordingly, the output of the gate AN2 changes to the H level, closing the relay 201 to energize the motor 202, thus driving the compressor 203. In this manner, a pressurized air is supplied to the air chamber of the suspension system 400. If the vehicle level returns to the "medium high" region by the time the counter CO2 completes its up-counting operation to the $Q_3$ count or the time delay $t_s$, the flipflop FF1 is reset to change the output of the gate NOR1 to its H level, whereby the counter CO2 is cleared, preventing the output from the gate NOR2 from assuming the H level. In this manner, the compressor 203 cannot be driven if the vehicle level temporarily changes to the "low" region and immediately turns to the "medium high" region as may be caused by oscillations. At a time interval after the output of the gate NOR2 has changed to the H level (which enables the compressor 203 to be driven), the output of the gate NOR2 changes to its L level, interrupting the drive of the compressor 203 if the level raising command signal continues to be present. Thus, this time interval corresponds to the $Q_3$ count of the counter CO3 and defines the maximum drive time interval for the compressor 203. The purpose of such an arrangement is to prevent the supply of an excessively high air pressure and an overloading of the motor and the compressor in the event an increase in the air pressure fails to increase the vehicle level due to the failure of certain parts or under an excessively high loading of the vehicle. However, in normal instances, the vehicle level will be raised as the compressor 203 is driven, and the vehicle level will enter the "medium high" region by the time the counter CO3 reaches the given count. Thus, the flipflop FF1 is reset to change the output of the gate AN2 to its L level, thus ceasing to drive the compressor 203.

Figure 3A:
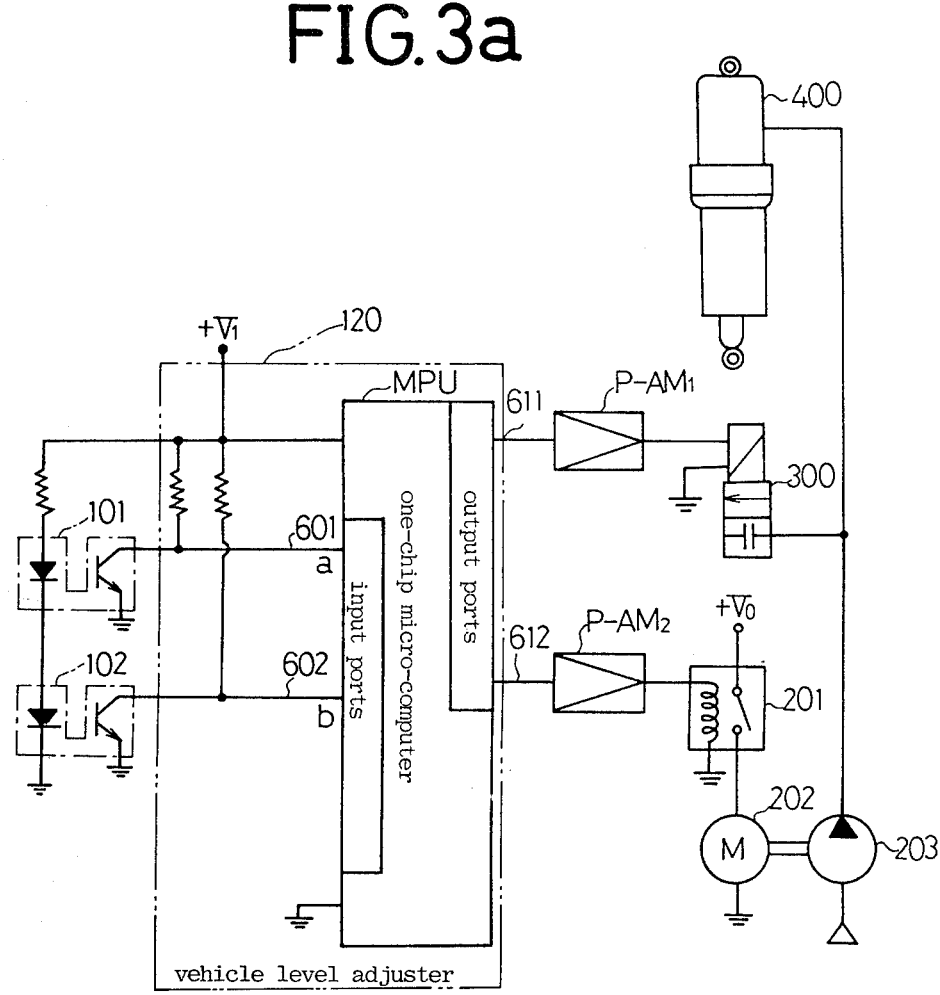
FIG. 3a is a block diagram of another embodiment of the invention.

FIG. 3a shows another embodiment of the invention in which the vehicle level adjuster 120 is formed by one chip microcomputer MPU. The MPU includes an ROM (read only memory) which stores programs for controlling the opening/closing of the relief valve 300 and the energization/deenergization of the motor 202 in accordance with the outputs a and b from the level detector 100. A sequence of control operations performed by the MPU based on such program is illustrated by a flow chart in FIG. 3b. In this flow chart, the term "register" and the term "flag" each represent a single memory location of an RAM (rangom access memory) of the MPU. The term "flag set" refer to the storage of a status data while the term "timer" refers to the execution of a programmed timer which counts a preset number of clock pulses or timing pulses.

Figure 3B:
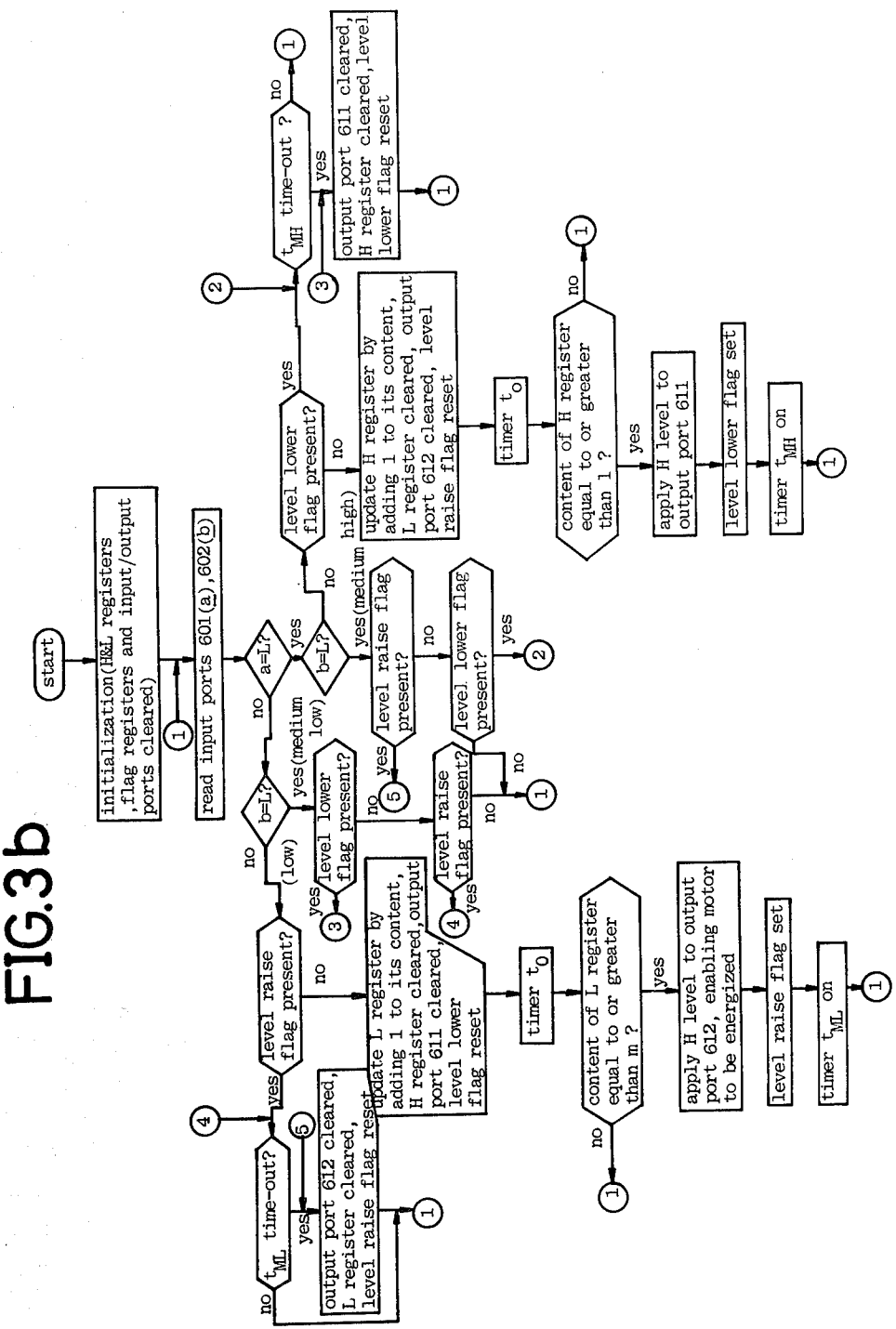

A control operation by the MPU will be described below with reference to FIG. 3b. Initially the MPU reads input ports 601, 602 (or signals a, b). If these signals indicate a vehicle level in the "high" region, 1 is added to the content of an H register which contains a duration over which the vehicle remains in the "high" region, and the sum is used to update the content of the H register. An output port 612 is cleared for purpose of assurance, and a programmed timer $t_0$ is executed, and upon time-out, a reference is made to the content of the H register, and if it is equal to or greater than a given value l, an H level is applied to an output port 611 to allow a relief valve 300 to be opened. Also a level lower flag is set, and a level lower limit timer $t_{MH}$ is turned on or set. The H level at the output port 611 and the level lower flag are both cleared or returned to the L level when the vehicle level enters the "medium low" region or upon the time-out of the timer $t_{MH}$, whichever occurs first. If the content of the H register is less than the value l, the microcomputer returns to reading the input ports. As a result, if the vehicle level changes from the "medium high" to the "high" region, the relief valve 300 is not opened immediately, but is opened only after a vehicle level in the "high" region continues over a period corresponding to $lt_0$. The duration $lt_0$ corresponds to the time interval required for the counter CO2 of the previous embodiment to count up to a given count corresponding to the $Q_3$ count. Also, $t_{MH}$ corresponds to the time interval required for the counter CO3 to count up to the given count corresponding to the $Q_3$ count.

If the signals a and b at the input ports 601, 602 indicate a vehicle level in the "low" region, 1 is added to the content of an L register which contains a duration over which the vehicle level remains in the "low" region, and the sum is used to update the L register. The output port 611 is cleared for purpose of assurance, and the programmed timer $t_0$ is executed. Upon time-out, a reference is made to the content of the L register, and if it is equal to or greater than a given value m, an H level is applied to an output port 612 to allow the compressor 203 to be driven, and also a level raise flag is set. The H level at the output port 612 is cleared or returned to the L level when the vehicle level enters the "medium high" region or upon the time-out of the timer $t_{ML}$, whichever occurs first. If the content of the L register is less than the given value m, the microcomputer returns to reading the input ports. As a result, if the vehicle level changes from the "medium low" to the "low" region, the compressor 203 is not driven immediately, but is driven only after the vehicle level in the "low" region continues over a time interval of $mt_0$.

What is claimed is:
1. A vehicle level controller comprising:
a vehicle level detector capable of producing a level detection signal indicative of at least four regions of vehicle level including a "high", a "medium high", a "medium low" and a "low" region,
and a vehicle level adjuster comprising a micro-computer operative to determine a particular region of vehicle level in response to the level detection signal, the microcomputer operating to produce a level lowering command signal in response to a signal indicative of vehicle level in the "high" region, to terminate the level lowering command signal in response to a signal indicative of a level in the "medium low" region, to produce a level raising command signal in response to a signal indicative of a vehicale level in the "low" region and to terminate the level raising command signal in response to a signal indicative of a vehicle level in the "medioum high" region, the microcomputer applying a first signal to a drive system associated with a suspension system of the vehicle which causes the vehicle level to be lowered for a time interval less than or equal to a period during which the level lowering command signal is present and applying a second signal to the drive system which causes the vehicle level to be raised for a time interval less than or equal to a period during which the level raising command signal is present.

2. A vehicle level controller according to claim 1 in which the vehicle level microcomputer comprises a signal processor responsive to the level detection signal from the level detector by producing a level lowering command signal in response to a vehicle level in the "high" region, and producing a level raising command signal in response to a vehicle level in the "low" region, and terminating the level lowering command signal in response to a vehicle level in the "medium low" region and terminating the level raising command signal in response to a vehicle level in the "medium high" region; and a level control circuit for producing the first signal for a time interval less than or equal to a period during which the level lowering command signal is present and for producing the second signal for a time interval less than or equal to a period during which the level raising command signal is present, so as to be fed to the drive system.

3. A vehicle level controller according to claim 2 in which the signal processor comprises a pair of flipflops, and gate means responsive to the level detection signal for setting one of the flipflops to produce the level raising command signal in response to a vehicle level in the "low" region and for resetting said one flipflop in response to a vehicle level in the "medium high" region, and for setting the other flipflop to produce the level lowering command signal in response to a vehicle level in the "high" region and for resetting said other flipflop in response to a vehicle level in the "medium low" region.

4. A vehicle level controller according to claim 2 in which the level control circuit comprises a first counter which is enabled in response to the level raising and the level lowering command signal, a second counter which is enabled upon completion of a counting operation by the first counter of a given number of timing pulses, and gate means for allowing the level raising and the level lowering command signal to be applied to the drive system during the time the second counter is counting the given number of timing pulses and for disabling the application of the level raising and the level lowering command signal until the first counter has counted the given number of timing pulses and after the second counter has counted the given number of timing pulses.

5. A vehicle level controller according to claim 1 in which the level detector comprises two switch means secured to a printed circuit board, and switch operating means fixedly mounted on a rotary shaft.

6. A vehicle level controller according to claim 5 in which each of the switch means comprises a photosensor including a light emitting source and a light detecting element, and the switch operating means comprises light shield members which selectively intercept a light path between the light emitting source and the light detecting element in accordance with the angle of rotation of the rotary shaft.

7. A vehicle level controller according to claim 1 in which the microcomputer counts a time duration during which a vehicle level in either the high or the low range continues, clears a count representing the time duration during which a vehicle level in the high range continues whenever a vehicle level in the low range and the medium low range is detected, clears a count representing the duration during which a vehicle level in the low range continues whenever a vehicle level in the high range and the medium high range is detected, outputs a level lowering command signal if the count representing the duration during which a vehicle level in the high range continues exceeds a first value l, outputs a level raising command signal if the count representing the duration during which a vehicle level in the low range continues exceeds a second value m, and resets the level lowering and the level raising command signal when a vehicle level in "medium low" and "medium high" regions, respectively, is detected.

8. A vehicle level controller comprising:
a vehicle level detector including two switch means secured to a printed circuit board and switch operating means fixedly mounted on a rotary shaft;
signal processing means for processing signals fed from the two switch means of the level detector to form level lowering command signal or level raising command signal;
first counter means responsive to the occurrence of level lowering command signal or level raising command signal to provide a count enabling signal only if such signal continues over a given duration;
a first and a second gate means which supply out level lowering command signal and level raising command signal, respectively, only if the count enabling signal exist and the gate OFF signal is not exist.

9. A vehicle level controller according to claim 8 in which the signal processing means comprises a pair of flipflops, gate means responsive to the level detection signal by setting one of the flipflops to produce the level raising command signal in response to a vehicle level in the "low" region and for resetting said one flipflop in response to a vehicle level in the "medium high" region, and setting the other flipflop to produce the level lowering command signal in response to a vehicle level in the "high" region and for resetting said other flipflop in response to a vehicle level in the "medium low" region, and another gate means for supplying a count enabling signal to the first counter in response to the level lowering or the level raising command signal.

10. A vehicle level controller comprising:
a vehicle level detector including two switch means secured to a printed circuit board and switch operating means fixedly mounted on a rotary shaft;
and a microcomputer which determines a vehicle level in either a high range, a medium high region, a medium low region and a low range responsive to signals fed from the two switch means of the level detector, counts a time duration during which a vehicle level in the high or the low range continues, clears a count representing the time duration during which a vehicle level in the high range continues whenever a vehicle level in the low range or the medium low region is detected, clears a count representing the time duration during which a vehicle level in the low range continues whenever a vehicle level in the high range or the medium high region is detected, outputs a level lowering command signal when a count representing the time duration during which a vehicle level in the high region continues exceeds a first value l, outputs a level raising command signal when a count representing the time duration during which a vehicle level in the low range continues exceeds a second value m, and resets the level lowering and the level raising command signal in response to a detected vehicle level in the medium low and high region, respectively.

11. A vehicle level controller according to claim 10 in which the microcomputer includes output ports from which the vehicle lowering and the vehicle raising command signal are delivered, the microcomputer resetting the output ports immediately upon the application of a power supply thereto.

* * * * *